Patented Dec. 30, 1941

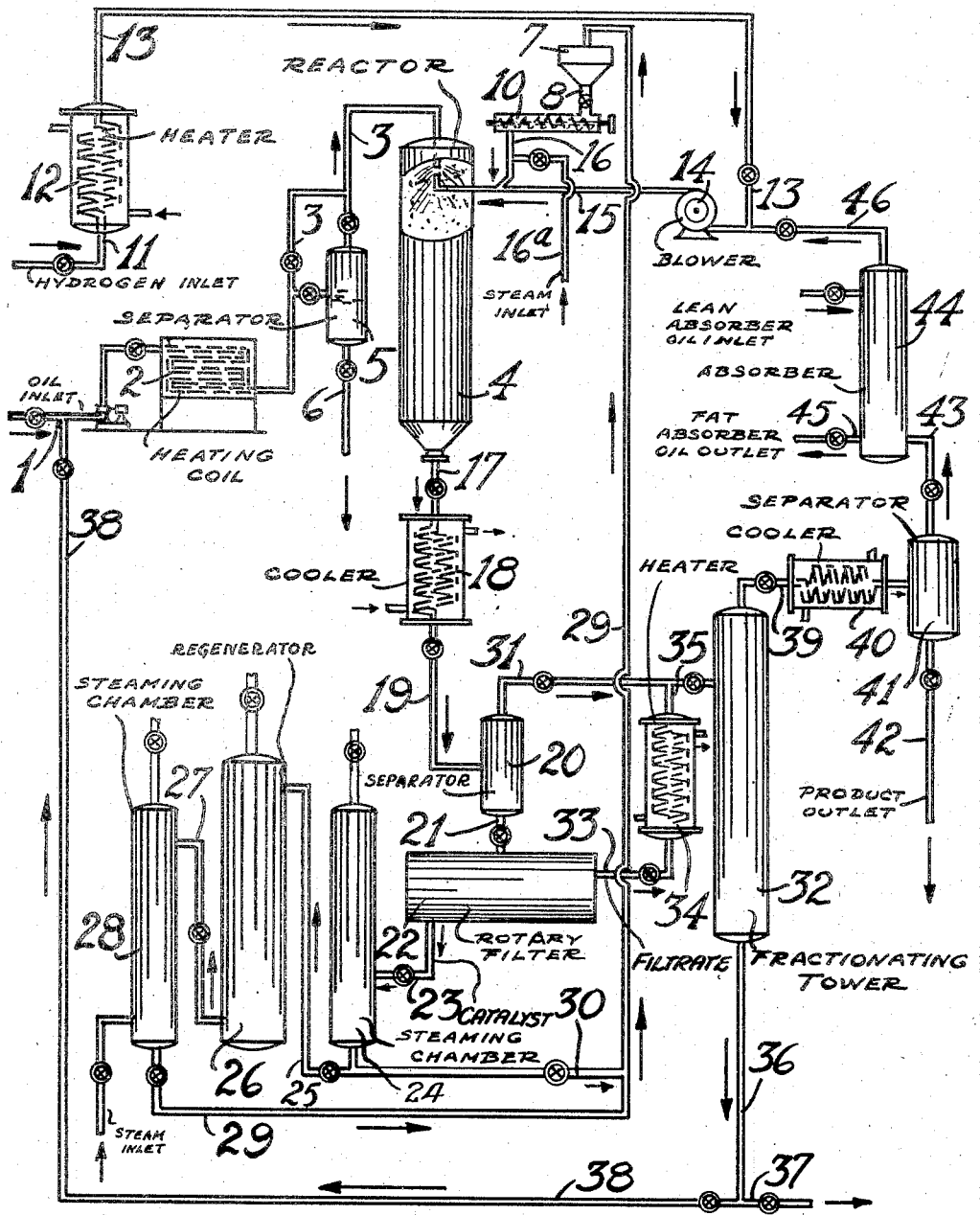

2,268,094

UNITED STATES PATENT OFFICE 2,268,094

CATALYTIC PROCESS FOR TREATING HYDROCARBON OILS

Robert P. Russell, Millburn, N. J., assignor to Standard Oil Development Company, a corporation of Delaware Application February 9, 1939, Serial No. 255,390

8 Claims. (Cl. 196—52)

This invention relates to the treatment of hydrocarbon oils by catalytic processes such as catalytic cracking, catalytic reforming, catalytic dehydrogenation and the like.

The invention will be described with particular reference to catalytic cracking but it should be understood that it is not limited thereto. The drawing is a semi-diagrammatic view in sectional elevation of one type of apparatus which may be used.

In the catalytic cracking of heavy hydrocarbon oils to produce lower boiling hydrocarbons of high octane number suitable for motor fuel, the heavy oil is first vaporized, and the vapors are then passed through a reaction chamber wherein they come in contact with a catalytic material such as an adsorptive clay, activated alumina or activated hydrosilicates of aluminum. There are several different methods by which contact of the vapors with the catalyst may be brought about. One method is to pass the vapors through a reaction chamber provided with stationary catalyst. Another method is to pass the vapors over a continuously moving mass of granular catalyst. Another method is to suspend the finely divided catalytic material in the oil before it is introduced into the reaction chamber. A fourth method is to introduce the catalyst in finely-divided, comminuted or powdered form suspended in a gaseous medium whereby it is carried along with the vapors through the reaction chamber and is subsequently separated from the liquid products.

In all these processes the catalyst gradually loses its efficiency because of the deposition thereon of contaminants such as tarry or coky material. Consequently, means must be provided for removing these contaminants from time to time in order to regenerate the activity of the catalyst. When a stationary catalyst is used, it can be seen that the catalytic cracking process must be intermittent, that is, there is first a cracking cycle and then a regenerating cycle. When a moving granular catalyst or a powdered catalyst is used, the process may be continuous because the cracking can continue in one vessel while the spent catalyst is being regenerated in another vessel.

Because of the necessity for periodic regeneration of the catalyst, it will be appreciated that it is desirable to make the active life of the catalyst as long as possible and to make the regenerating period as short as possible.

The present invention is directed primarily to improved methods of carrying out the catalytic process in the presence of powdered catalyst whereby the active life of the catalyst may be substantially lengthened. The nature of these improvements will be fully understood from the following description read with reference to the accompanying drawing.

According to the present invention, the catalytic process is carried out in the presence of hydrogen or gases rich in free hydrogen, in the presence of powdered or finely divided catalyst, and the hydrogen is used as the medium in which the finely divided catalyst is suspended prior to its introduction into the reaction zone. The process is operated at temperatures, pressures, space velocities and with quantities of hydrogen such that there is no net consumption of free hydrogen and in fact there may be a net production of hydrogen.

Referring to the drawing, numeral 1 designates a pipe through which oil is introduced into the system. The oil passes through a heating means 2 wherein it is vaporized and thence flows through line 3 into the top of a reaction chamber 4. In the event some of the heavier fractions of the oil are not vaporized, the heated oil is passed through a separator 5 in which the unvaporized fractions may be separated from the vapors and removed through line 6. Line 3 which enters the top of the reaction chamber 4 terminates in a jet or nozzle whereby the vapors may be injected into the chamber at high velocity.

Finely divided, comminuted or powdered catalyst, preferably passing a 200 to 300 mesh screen, is stored in a hopper 7 and drawn through line 8 by a screw conveying means 10. Hydrogen or a gas rich in free hydrogen is supplied through line 11, passes through a heating means 12 and thence flows through line 13 into and through a blowing means 14. Hot hydrogen is forced at high velocity through line 15 into which powdered catalyst is forced by screw conveying means 10 through line 16. Screw conveying means 10 is one which can build up a pressure of 200 or more pounds per square inch. A line 16—a may be provided through which steam or inert gas may be injected into line 16 to prevent leakage of hydrogen from line 15 into the screw conveying means. The mixture of hydrogen and finely divided catalyst is then introduced at high velocity into the top of the reaction chamber 4 through a jet or nozzle which discharges immediately below the point at which the heated vapors are introduced. The two streams impinge upon each other and a thorough and intimate mixture of oil vapors, catalyst and hydrogen is formed.

The reaction products containing suspended catalyst are removed from reaction chamber 4 through line 17 and pass thence into a cooling means 18 wherein the products are partially condensed. From cooling means 18 the products pass through line 19 into a separating means 20 wherein the liquid products containing the finely divided catalyst particles are separated from the uncondensed products.

The liquid products are removed from separating means 20 through line 21 and pass thence into a filtering means 22, which may be a rotary filter or any other suitable type, wherein the catalyst particles are separated from the liquid. The catalyst is removed from filtering means 22 through line 23 and is introduced into a steaming chamber 24 wherein the adsorbed oil and vapors are steamed out of it. The thoroughly steamed and purged catalyst is then conveyed by a means diagrammatically designated as line 25 into a regenerating means 26 wherein the contaminants are removed from the catalyst by treatment with steam or other inert gases containing controlled quantities of air or oxygen. The coke and tarry matter is thus removed by combustion, care being taken not to allow the combustion to proceed too rapidly.

From regenerating means 26 the regenerated catalyst passes through a conveying means denoted by line 27 into another steaming chamber 28 wherein all oxygen and other gases are purged out of the catalyst by means of steam or evacuation. The regenerated and purged catalyst is then conveyed by means denoted by line 29 into the hopper 7 from which it is again introduced into the reaction chamber in the manner previously described.

It will be understood that it may not be necessary to regenerate the catalyst after each passage through the reaction chamber and in such event the catalyst may be returned directly to the hopper 7 from the steaming chamber 24. This may be done by means of valved line 30 connecting line 25 with line 29.

Going back to the separating means 20 and the filtering means 22, the uncondensed products are removed from separating means 20 through line 31 and introduced into a fractionating means 32. Similarly, the filtrate from filtering means 22 is removed through line 33 and preferably after passing through a heating means 34 passes through line 35 into fractionating means 32.

The heavier fractions boiling above the motor fuel range are removed from fractionating means 32 through line 36 and may be withdrawn completely from the process through line 37 or may be returned to the process through line 38.

The desired fractions boiling in the motor fuel range are removed from fractionating means 32 through line 39, pass thence through a cooling means 40 and thence into a separating means 41 from which the liquid product is removed through line 42.

The uncondensed gases in separating drum 41 are removed through line 43. These gases as will be understood contain substantial quantities of hydrogen, and also methane, ethane and other normally gaseous hydrocarbons. The hydrogen in these gases may be recycled through the process. In order to remove the bulk of the hydrocarbons the gases from separating means 41 are passed through line 43 into an absorbing means 44 wherein they are caused to flow in counter current to an absorber oil such as a gas oil or heavy naphtha. The absorber oil absorbs most of the hydrocarbons except the methane. The fat absorber oil is removed through line 45 and the unabsorbed gases consisting principally of hydrogen and methane are removed through line 46 and may thence be returned to the system through the blowing means 14 and line 15.

In the operation of the process the oil and hydrogen are separately treated to approximately reaction temperature which may range between 750 and 1100° F. depending upon what type of reaction is desired. For catalytic cracking, temperatures between 750 and 850° F. would be used and for catalytic reforming temperatures between say 900 and 1000° F. would be suitable. The oil and hydrogen are introduced into the reaction chamber under a pressure which may range from 100 to 1000 lbs./sq. inch, although moderate pressures between 200 and 400 are preferable.

The quantity of hydrogen used may vary between 1000 and 6000 cu. ft. per barrel of oil, but quantities between 2000 and 3000 cu. ft. are sufficient in most cases.

The ratio of catalyst to oil may vary from about 3 parts by weight of catalyst to 1 part by weight of oil to as little as .05 part by weight of catalyst to 1 part of oil. In most cases from .08 to 1.5 parts of catalyst to 1 part of oil will be sufficient to give highly satisfactory results.

The quantity of hydrogen necessary to suspend these quantities of catalyst will in general be far less than the quantity of hydrogen it is desired to use in the process.

It is found that by carrying out the catalytic reaction in the presence of hydrogen under these special conditions, the active life of the catalyst is not only greatly lengthened, thus making the necessity for regeneration less frequent, but the yields and quality of the product obtained are markedly better than those of the product obtained when carrying out the process in the absence of hydrogen and under lower pressures. By operating under the conditions specified, it is found that there is no net consumption of hydrogen during the process and in fact at the higher operating temperatures there is actually a net production of hydrogen.

The regeneration of the catalyst is preferably accomplished by passing inert gases containing between 4 and 10% of oxygen through the catalyst particles after they have been purged of all adsorbed oil vapors and hydrogen. In this way the coke is removed from the catalyst by combustion. The quantity of oxygen in the regenerating gases is preferably relatively low at the start of the regeneration cycle when combustion is rapid but may be gradually increased as the coke is burned off until near the end of the cycle the quantity of oxygen reaches a maximum. This is to avoid excessive temperatures being developed. In general, it is best to keep the maximum temperature during regeneration below about 1200 to 1300° F. Higher temperatures are apt to impair the activity of the catalyst. The regenerating gases may consist of nitrogen, flue gases, steam or other inert gases and 4 to 10% oxygen, and are preferably heated to a temperature between 600 and 800° F. before being introduced into the regenerating means. Both before and after regeneration, the catalyst should be thoroughly purged with steam or subjected to a vacuum or both.

The catalysts used may be selected from a wide variety of materials. Natural clays or acid activated clays of the bentonitic type are suitable. Synthetic clays such as activated alumina and silica either alone or impregnated or mixed with other materials may be used. Alumina or silica impregnated with solutions of salts of metals of group VI of the periodic system such as molybdenum, tungsten and chromium, or alumina or silica mixed with oxides or sulfides of these metals are especially effective. It is found that sulfur or sulfur-containing compounds help to maintain the activity of the catalysts. Hydrogen sulfide, carbon disulfide, free sulfur or other sulfur supplying substances may therefore be introduced into the reaction zone from time to time or continuously in quantities sufficient for this purpose.

As indicated above, the catalytic process is operated under conditions such that there is substantially no net consumption of hydrogen. As a result, it will be seen that fresh hydrogen need only be introduced during the early stages of the process because it may be continuously recycled in the manner described by removing most of the uncondensable hydrocarbon gases. As the recycled gas becomes poorer in hydrogen, either fresh hydrogen may be introduced or the pressure may be increased to increase the partial pressure of the hydrogen.

This type of operation is generally applicable to all types of catalytic processes for treating hydrocarbon oils. While it has been described with particular reference to catalytic cracking, it will be understood that slight variations in the temperatures and pressures and quantity of hydrogen may be made to adapt it for other catalytic processes such as catalytic reforming, catalytic dehydrogenation, catalytic gas reversion and the like.

Hydrocarbon oils from any source may be subjected to catalytic treatment according to the present process, for example, virgin or cracked oils derived from petroleum, oils derived from the destructive distillation or destructive hydrogenation of coals, tars, mineral oils, peats, lignites, shales, bitumens, or oils derived by synthetic processes such as the Fisher Synthesis.

This invention is not limited by any theories of the mechanism of the reactions, nor by any details which have been given merely for purposes of illustration but is limited only in and by the following claims in which it is intended to claim all novelty inherent in the invention.

I claim:

1. In a catalytic process for treating hydrocarbon oils in vapor phase at elevated temperatures and in the presence of a finely divided solid catalytic material, the improvements which comprise carrying out the process in the presence of hydrogen under conditions such that there is no net consumption of free hydrogen, and introducing the finely divided solid catalytic material suspended in the hydrogen into the reaction zone at a point close to the point of introduction of the oil vapors to be treated, whereby a thorough mixture of oil vapors, finely divided catalytic material and hydrogen is formed.

2. An improved process for catalytically treating hydrocarbon oil at elevated temperatures which comprises vaporizing the oil, introducing the oil vapors at high velocity into a reaction chamber, separately heating a stream of hydrogen, introducing finely divided catalytic material into the stream of heated hydrogen, introducing the stream of hydrogen containing finely divided catalytic material in suspension at high velocity into the reaction chamber at a point close to the point of introduction of the oil vapors, whereby a thorough mixture of oil vapors, hydrogen and finely divided catalytic material is formed, removing the products of reaction from the reaction chamber, partially condensing the same, separating the finely divided catalytic material from the liquid products, the reaction zone being maintained under a pressure between 200 and 400 lbs./sq. in., the quantity of hydrogen present in the reaction zone being between 2000 and 4000 cubic feet per barrel of oil and the other conditions of operation being adjusted vis-a-vis the pressure and quantity of hydrogen so that there will be no net consumption of the hydrogen in the reaction.

3. An improved process for the catalytic treatment of hydrocarbon oils at elevated temperatures and in the presence of hydrogen under conditions such that there is no net consumption of free hydrogen, which comprises vaporizing the oil, introducing the oil vapors at high velocity into a reaction chamber, separately heating a stream of hydrogen, introducing finely divided catalytic material into the stream of heated hydrogen, introducing the stream of hydrogen containing suspended finely divided catalytic material at high velocity into the reaction chamber at a point close to the point of introduction of the oil vapors, maintaining the reaction chamber under a pressure between 200 and 400 lbs./sq. in., withdrawing the products of reaction, partially condensing the same, separating the finely divided catalytic material from the liquid products, separating the hydrogen and methane from the gaseous products and returning the finely divided catalytic material in suspension in the hydrogen and methane to the process.

4. Process according to claim 3 in which the hydrogen and methane are separated from the uncondensable gases formed in the process by passing the uncondensable gases through a light hydrocarbon oil whereby the hydrocarbon constituents, other than methane, of the uncondensable gases are absorbed.

5. Process according to claim 3 in which the quantity of hydrogen present in the reaction chamber is regulated between 2000 and 4000 cubic feet per barrel of oil.

6. An improved process for catalytically reforming hydrocarbon oils to produce hydrocarbons of high octane number suitable for motor fuel, which comprises vaporizing the oil, separately heating a stream of hydrogen, introducing a finely divided catalytic material into the stream of hydrogen, introducing the vaporized oil and hydrogen containing finely divided catalytic material in suspension at high velocity into the reaction chamber at closely spaced points whereby a thorough mixture of oil vapor, hydrogen and finely divided catalytic material is formed, maintaining the reaction chamber at a temperature between 900 and 1000° F., under a pressure between 200 and 400 pounds per square inch in the presence of quantities of hydrogen regulated between 2000 and 4000 cubic feet per barrel of oil and adjusting the other conditions of operation vis-a-vis the temperature, pressure and quantity of hydrogen so that there will be no net consumption of free hydrogen in the reaction, withdrawing the products of reaction, partially condensing the same, filtering the finely divided catalytic material from the liquid products, removing the contaminating material deposited on the finely divided catalyst by combustion, recovering the free hydrogen from the uncondensable gases formed in the reaction, and returning the regenerated finely divided catalytic material suspended in the recovered free hydrogen to the process, and recovering a fraction boiling in the motor fuel range from the liquid products.

7. Process according to claim 6 in which the catalytic material is a finely divided adsorptive clay passing a 300 mesh screen.

8. Process according to claim 6 in which the catalytic material is finely divided alumina carrying a compound of a metal of the Sixth Group of the Periodic System.

ROBERT P. RUSSELL.